(12) United States Patent
Hatanaka

(10) Patent No.: US 7,959,538 B2
(45) Date of Patent: Jun. 14, 2011

(54) DEVICE AND METHOD FOR CONTROLLING ENGINE AND HYDRAULIC PUMP OF WORKING VEHICLE

(75) Inventor: Yasushi Hatanaka, Komatsu (JP)

(73) Assignee: Komatsu Ltd., Tokyo (JP)

( * ) Notice: Subject to any disclaimer, the term of this patent is extended or adjusted under 35 U.S.C. 154(b) by 700 days.

(21) Appl. No.: 12/083,483

(22) PCT Filed: Sep. 20, 2006

(86) PCT No.: PCT/JP2006/318617
§ 371 (c)(1),
(2), (4) Date: Apr. 14, 2008

(87) PCT Pub. No.: WO2007/043290
PCT Pub. Date: Apr. 19, 2007

(65) Prior Publication Data
US 2009/0111655 A1 Apr. 30, 2009

(30) Foreign Application Priority Data

Oct. 14, 2005 (JP) ................. 2005-300264

(51) Int. Cl.
B60W 10/04 (2006.01)
B60K 6/00 (2007.10)
B60K 17/28 (2007.10)
(52) U.S. Cl. ........ 477/187; 477/203; 180/165; 180/53.4
(58) Field of Classification Search .................. 477/183, 477/187, 203, 205; 180/165, 53.4, 53.8
See application file for complete search history.

(56) References Cited

U.S. PATENT DOCUMENTS 5,611,751 A * 3/1997 Ehrenhardt et al. ............ 477/73
(Continued)

FOREIGN PATENT DOCUMENTS

JP 63-265730 11/1988
(Continued)

OTHER PUBLICATIONS

International Search Report issued Dec. 19, 2006 in the International (PCT) Application of which the present application is the U.S. National Stage.

Primary Examiner — Roger Pang
(74) Attorney, Agent, or Firm — Wenderoth, Lind & Ponack, L.L.P.

(57) ABSTRACT

An engine of a working vehicle in which an adverse effect of oil temperature rise is avoided, by decreasing a load applied to an accelerator when the working vehicle moves while lifting a boom and approaches a place where the load in a bucket is to be dumped during dump approach and, reducing heat generated through operation of a brake, and deterioration in work efficiency of the working vehicle is avoided by preventing the lifting speed of a boom from decreasing. A hydraulic pump controller and a method for controlling the hydraulic pump are also provided. On conditions that a throttle amount sensor detects that an operation amount of an accelerator pedal is a prescribed threshold value (operation amount 70%) or higher, a brake pressure sensor detects that a brake unit is actuated (brake on), and a vehicle speed sensor detects that a body speed is a prescribed threshold value or higher, a transmission controller outputs a throttle correction order to decrease a target engine speed to a governor through an engine controller, and outputs to a pump control valve through a work equipment controller an order to change a swash plate angle at the time of lifting the boom to cover a decrease amount of a discharge flow rate of a hydraulic pump by the throttle correction order to maintain the discharge flow rate from the hydraulic pump.

4 Claims, 5 Drawing Sheets

U.S. PATENT DOCUMENTS 5,794,734 A * 8/1998 Fahl et al. .................. 180/165
7,493,978 B2 * 2/2009 Nakamura et al. ........... 180/53.4

FOREIGN PATENT DOCUMENTS

| | | | | |
|---|---|---|---|---|
| JP | 2-50146 | | 4/1990 | |
| JP | 04258571 A | * | 9/1992 | ............ 180/53.4 |
| JP | 04266657 A | * | 9/1992 | ............ 180/165 |
| JP | 7-180576 | | 7/1995 | |

* cited by examiner

DEVICE AND METHOD FOR CONTROLLING ENGINE AND HYDRAULIC PUMP OF WORKING VEHICLE

TECHNICAL FIELD

The present invention relates to a working vehicle in which power from an engine is provided to a traveling power train and a hydraulic pump; drive wheels are driven through the traveling power train; and work equipment and so on are operated through the hydraulic pump, more particularly to a device and a method for controlling the engine and the hydraulic pump.

BACKGROUND ART

In a wheel loader, a power from an engine is provided to a traveling power train and a hydraulic pump; drive wheels are driven through the traveling power train; and work equipment and so on are operated through the hydraulic pump. In other words, output (torque) of the engine is transmitted to the drive wheels through the traveling power train (power transmission device) such as a torque converter and a transmission. With this configuration, the drive wheels are driven and the wheel loader is made travel. As described above, part of horsepower from the engine is consumed as torque converter absorption horsepower.

Additionally, the engine output is transmitted to the hydraulic pump to make the hydraulic pump drive. In the way stated above, pressurized oil is supplied from the hydraulic pump to a hydraulic actuator (hydraulic cylinder) to actuate work equipment (boom, bucket, etc.), a cooling fan and so on, and operations and so on are carried out. As described above, part of the horsepower from the engine is consumed as pump absorption horsepower.

As one mode of the operations carried out by the wheel loader, there exists a loading operation as shown in FIG. 1.

In other words, the wheel loader 100 excavates and scoops grounds, earth and sand and other loads by a bucket 90. After the load is scooped, the bucket 90 is put into a tilt end position (FIG. 1A). Then, the vehicle moves forward while lifting a boom (lift arm) 80 (FIGS. 1B and 1C). After that, the load in the bucket 90 is dumped and loaded to a dump body of a dump truck 200 (FIG. 1D).

Here, at the time of dump approach, when the wheel loader 100 moves forward while lifting the boom 80 and approaches the dump truck 200, a brake is actuated to stop at a place of the dump truck 200.

A wet disc brake unit is employed as a brake unit, and is provided to a front and a rear axles. Additionally, for the front and the rear axles, various types of gears and so on are provided, and are soaked into axle oil to lubricate sliding surfaces of the gears and so on.

Patent Literature 1 below provides an invention in which it is determined, by detecting a vertical position of a boom, whether or not it is in a dump approach; and, when it is determined that it is in the time of dump approach, an automatic transmission device is controlled so as not to shift down, whereby a state where a hard braking occurs due to the shift down can be avoided.

Patent Literature 1: Japanese Patent Application Laid-open No. 63-265730

DISCLOSURE OF THE INVENTION

Problems to be Solved by the Invention

At the time of dump approach, an acceleration pedal is largely depressed in order to lift the boom 80. Additionally, in a case when the brake is applied, great driving force is applied to the axle, which causes large load to be applied to the axle. By applying the brake, a speed of a heavy and fast-moving vehicle body that carries the load is reduced. This causes generation of significant frictional heat at the disc brake, and the frictional heat is transferred to the axle oil. Since the load to the axle is great and the heat generated by the braking is added to the axle, the axle oil temperature rises, which may adversely affect the lubricity of the oil and so on due to the oil temperature rise. Additionally, the heat generated at the brake unit leads to the large load for the brake unit itself, which has an adverse effect on the performance of the brake unit, such as durability.

Here, it may be considered to employ a system that cools the axle oil using an oil cooler. However, the cooling system results in increasing the cost.

Additionally, it may also be considered to employ a configuration of reducing the load applied to the axle and the amount of heat generated through the brake operation by lowering the speed of the vehicle during the dump approach. However, the lowered vehicle speed leads to a low engine speed, which reduces the flow rate discharged from a hydraulic pump. The reduced flow rate results in decreasing the lift speed of the boom 80, which poses a problem of deteriorating the operational efficiency.

The present invention has been made in view of the circumstances as described above, and the problem to be solved by the present invention is to avoid an adverse effect caused by an increase in oil temperature by reducing a load applied to an axle and reducing an amount of heat generated through a brake operation when a working vehicle moves while lifting a boom and approaches a place where a load in a bucket is to be dumped, such as during dump approach, and furthermore to avoid deteriorating operational efficiency of the working vehicle by not decreasing the lifting speed of a boom.

Means to Solve the Problems

A first aspect of the present invention provides a device for controlling an engine and a hydraulic pump of a working vehicle in which power of the engine is provided to a traveling power train and the hydraulic pump, driving wheels are driven through the traveling power train; and work equipment is operated through the hydraulic pump, the device comprising: accelerator operation means that sets a target speed of the engine according to an operation amount; engine speed adjusting means that adjusts a speed of the engine to the ordered target speed; hydraulic pump adjusting means that adjusts a displacement of the hydraulic pump so as to obtain an ordered discharge flow rate; acceleration amount detection means that detects that an operation amount of the accelerator operation means or the engine speed is a prescribed threshold value or higher; brake operation means that sets a braking force for a vehicle body according to an operation amount; brake means that generates the braking force so as to obtain the braking force set by the brake operation means; braking detection means that detects that the brake means is activated or that the brake operation means is operated; vehicle speed detection means that detects that a speed of the vehicle body is a prescribed threshold value or higher; and engine and hydraulic pump control means that provides the engine speed adjusting means with an order to decrease the target speed of the engine, and to cover a decrease in the discharge flow rate of the hydraulic pump due to the order, provides the hydraulic pump adjusting means with an order to maintain the discharge flow rate of the hydraulic pump, on conditions that the acceleration amount detection means detects that the operation amount of the accelerator operation means or the engine speed is the prescribed threshold value or higher; the braking detection means detects that the brake means is activated or that the brake operation means is operated; and the vehicle speed detection means detects that the speed of the vehicle body is the prescribed threshold value or higher.

A second aspect of the present invention provides a device for controlling an engine and a hydraulic pump of a working vehicle according to the first aspect of the present invention, wherein the working vehicle is a wheel loader; and each of the threshold values is set to a value suitable for a situation where the wheel loader moves while lifting a boom and approaches a place where a load in a bucket is to be dumped.

According to the present invention, on conditions that a throttle amount detection sensor 13 detects that an operation amount S of an accelerator pedal 10 is a prescribed threshold value (operation amount of 70%) or higher (step 302); a brake pressure detection sensor 19 detects that a brake unit 16 is actuated (applying brake; brake pressure Pbr is 0.5 MPa or higher; step 304); and a vehicle speed detection sensor 27 detects that a speed V of a body 101 is a prescribed threshold value (vehicle speed V of 2 km/h) or higher (step 303), a transmission controller 50 outputs a throttle correction order signal (order signal to decrease a throttle amount S by 5%) to decrease a target speed Nr of an engine 1 to a governor 11 through an engine controller 60, and outputs to a pump control valve 12 through a work equipment controller 70 an order to change a swash plate angle at the time of lifting a boom to cover an amount of a discharge flow rate Q of a hydraulic pump 3, which is decreased by the throttle correction order signal, (a decrease in a discharge flow rate Q by 5% due to a decrease in an engine speed N by 5%, which is caused by a decrease in the throttle amount S by 5%) to maintain the discharge flow rate Q from the hydraulic pump 3 (step 305). In this manner, when a wheel loader 100 moves while lifting a boom 80 and approaches a place where a load in a bucket 90 is to be dumped, such as during dump approach, a load applied to an axle 6 is reduced and an amount of heat generated by operating a brake unit 16 is reduced, whereby an adverse effect caused by an increase in oil temperature can be avoided. In addition to that, deterioration in efficiency of the operation carried out by the wheel loader 100 can be avoided because a lifting speed of the boom 80 is not decreased and is maintained to an original lifting speed.

According to the second aspect of the present invention, each of the threshold values for the conditions above is set to a value suitable for a situation (dump approach) where the wheel loader 100 moves while lifting the boom 80 and approaches the place where the load in the bucket 90 is to be dumped.

Third and fourth aspects of the present invention are method inventions, each corresponding to the first and the second aspects of the present invention.

BEST MODE FOR CARRYING OUT THE INVENTION

Hereinafter, an exemplary embodiment of the present invention will be described with reference to the drawings.

FIG. 2 is a block showing the exemplary embodiment and a configuration of a device for controlling an engine and a hydraulic pump of a working vehicle, and illustrating a part of a configuration of a wheel loader, the part being related to the present invention.

As shown in FIG. 2, in a wheel loader 100, power from an engine 1 is provided to a traveling power train 40 and a hydraulic pump 3; drive wheels 7 are driven through the traveling power train 40; and work equipment and so on are operated through the hydraulic pump 3.

An output shaft of the engine 1 for the wheel loader 100 is connected to a PTO shaft 30. The PTO shaft 30 is connected to a torque converter 2 as well as a hydraulic pump 3. The torque converter 2 is provided with a lock-up clutch 4 for locking up the torque converter 2 and is placed in parallel along a power transmission path 40.

Part of the output of the engine 1 is transmitted to the drive wheels 7 through the PTO shaft 30, the torque converter 2/lock-up clutch 4, a transmission 20, a reduction gear (differential gear) 5, an axle (front axle, rear axle) 6. Additionally, the rest of the output of the engine 1 is transmitted to the hydraulic pump 3 through the PTO shaft 30.

FIG. 3 shows an appearance of the wheel loader 100.

A boom (lift arm) 80 and a bucket 90, which form work equipment (loader), are provided in front of a body 101 of the wheel loader 100. The boom 80 is provided rotatably in a vertical direction with respect to the body 101 with a rotation center of the boom being a rotation shaft 82 located at its base. The bucket 90 is provided rotatably in a tilt direction A and a dump direction B with a rotation center of the bucket 90 being a rotation shaft 83 located at an end of the boom 80. A rod of a hydraulic cylinder for boom 81 is connected to the boom 80. A rod of a hydraulic cylinder for bucket 91 is connected to the bucket 90 through links 92L, 93L. A position of the boom 80 can be defined based on a longitudinal direction C of the boom 80, in other words, an axis line C connecting the rotation shaft 82 located at the base of the boom 80 with the rotation shaft 83 located at the end of the boom 80. At the time of dump approach, the axis line C in the longitudinal direction of the boom 80 is placed in an upward position with respect to a horizontal line H, in other words, the end rotation shaft 83 is in a higher position as compared with the base rotation shaft 82. In the present description, an angle α of the axis line C in the longitudinal direction of the boom 80 with respect to the horizontal line H is defined as a "boom angle." Additionally, a direction where the axis line C in the longitudinal direction of the boom 80 is placed in the upward position with respect to the horizontal line H (the end rotation shaft 83 is in the higher position as compared with the base rotation shaft 82) is set to a positive polarity of the "boom angle α." At the time of dump approach, the boom angle α is in a positive polarity (horizontal position or higher).

A boom angle detection sensor 84 (FIG. 2) for detecting the boom angle α is provided to the boom 80. The boom angle detection sensor 84 may be formed with an angle sensor such as a potentiometer, a stroke sensor for detecting a stroke position of the hydraulic cylinder for boom 81 or other sensors. A detected signal a of the boom angle detection sensor 84 is inputted to a work equipment controller 70.

When the rod of the hydraulic cylinder for bucket 91 is operated in a direction where the rod becomes shorter, the bucket 90 rotates in a dumping direction B. On the other hand, when the rod of the hydraulic cylinder 91 is operated in a direction where the rod becomes longer, the bucket 90 rotates in a tilt direction A.

When the bucket 90 rotates in the tilt direction A, an opening of the bucket 90 faces in the upward direction. On the other hand, when the bucket 90 rotates in the dumping direction B, the opening of the bucket 90 turns in the lateral direction. At the time of dump approach, the hydraulic cylinder for bucket 91 reaches the tilt end position, in other words, the rod of the hydraulic cylinder for bucket 91 reaches an approximate stroke end position or the stroke end position, which are on the extending side. It should be noted that, in the present description, the tilt end position includes not only a position where the hydraulic cylinder for bucket 91 is completely extended, but also a position where the hydraulic cylinder for bucket 91 is almost completely extended.

The hydraulic cylinder for bucket 91 is provided with a tilt end position detection sensor 92 (FIG. 2) for detecting that the cylinder reaches a tilt end position β. The tilt end position detection sensor 92 may be formed with a proximity switch, a limit switch, a stroke position sensor and so on provided to the hydraulic cylinder for bucket 91. The signal β detected by the tilt end position detection sensor 92 is inputted to the work equipment controller 70.

The hydraulic cylinder for boom 81 is provided with a boom bottom pressure detection sensor 85 (FIG. 2) for detecting a bottom pressure Pbm, which is a pressure of a bottom chamber of the hydraulic cylinder for boom 81. At the time of dump approach, since the boom 80 is being lifted while the load being carried in the bucket 90, the boom bottom pressure Pbm results in high pressure (20 MPa or higher). The signal Pbm detected by the boom bottom pressure detection sensor 85 is inputted to the work equipment controller 70.

Upon the hydraulic pump 3 being actuated, a pressurized oil discharged from the hydraulic pump 3 is delivered to the hydraulic cylinder for boom 81 and the hydraulic cylinder for bucket 91 through an operation valve for boom and an operation valve for bucket, respectively. Then, the hydraulic cylinder for boom 81 is operated at a speed in accordance with a discharge flow rate from the hydraulic pump 3. Similarly, the hydraulic cylinder for bucket 91 is operated at a speed in accordance with a discharge flow rate from the hydraulic pump 3.

It should be noted that the pressurized oil discharged from the hydraulic pump 3 is supplied to hydraulic actuators for operating a cooling fan, steering and so on. However, a configuration of the hydraulic circuit for it is omitted in the figure.

A transmission 20 comprises a forward-drive clutch 25 corresponding to a forward speed stage, a backward-drive clutch 26 corresponding to a backward speed stage and speed stage clutches 21-24 each corresponding to speed stages.

By controlling a hydraulic pressure (clutch pressure) of the pressurized oil supplied to each of the clutches 21-26 or discharged from each of the clutches 21-26, a friction engagement force between the input and the output sides of each of the clutches 21-26 is controlled. Similarly, by controlling a hydraulic pressure (clutch pressure) of the pressurized oil supplied to the lock-up clutch 4 or discharged from the lock-up clutch 4, a friction engagement force between the input and the output sides of the lock-up clutch 4 is controlled. Engagement operation (connecting operation) and disengagement operation (disconnecting operation) of each of the clutches 21-26 and the lock-up clutch 4 in the transmission 20 are controlled by a transmission controller 50.

A cab of the wheel loader 100 is equipped with a forward and backward drive selection operation lever 8, which is operation means, for selecting the forward drive stage (forward-drive clutch 25) or the backward drive stage (backward-drive clutch 26) in accordance with an operation position.

A forward and backward position signal indicating the operation positions (forward-drive position "F," backward-drive position "R," neutral position "M") of the forward and backward drive selection lever 8 is inputted to the transmission controller 50.

Additionally, the cab of the wheel loader 100 is equipped with a shift range lever 9 for selecting a speed change range of a speed stage in accordance with the operation position. A shift range signal indicating the operation positions of the shift range lever 9 is inputted to the transmission controller 50.

The cab of the wheel loader 100 is equipped with an accelerator pedal 10, which is accelerator operation means, for setting a target speed Nr of the engine 1 in accordance with the amount of the depression operation (throttle amount) S.

The engine 1 is equipped with a governor 11, which is engine speed adjusting means, for adjusting the speed N of the engine 1 to the ordered target speed Nr. An engine controller 60 outputs a throttle order signal to the governor 11, and controls the speed N of the engine 1 to the engine target speed Nr in accordance with the throttle signal to the governor 11.

The pump 3 is equipped with a pump control valve 12, which is hydraulic pump adjusting means, for adjusting a displacement q (cc/rev) of the hydraulic pump 3 to the ordered discharge flow rate Q (1/min). The work equipment controller 70, which forms a pump controller, outputs a pump swash plate order signal, and controls a swash plate angle (displacement q) of the hydraulic pump 3 so as to obtain a swash plate angle (displacement q) according to the pump swash plate order signal.

The operation amount (throttle amount) S of the accelerator pedal 10 is detected by a throttle amount detection sensor 13, which is acceleration amount detection means. Additionally, the engine speed N is detected by the engine speed detection sensor 14. The signal S detected by the throttle amount detection sensor 13 and the signal N detected by the engine speed detection sensor 14 are inputted to the engine controller 60. Additionally, the signal S detected by the throttle amount detection sensor 13 is also inputted to the transmission controller 50.

The cab of the wheel loader 100 is equipped with a brake pedal 15, which is brake operation means, for setting a braking force for the body 101 in accordance with the operation amount of pedal depression U.

The axle 6 is equipped with a brake unit 16, which is brake means, for reducing a speed of the body 101 by applying the braking force to the axle 6 (drive wheel 7). The brake unit 16 is a hydraulic-type brake unit that applies or releases (stop applying) the braking force in accordance with a pressure (brake pressure) of the supplied hydraulic fluid.

The brake control valve 17 has a brake operation position 17A and a brake release position 17B. The pressure (brake pressure Pbr) of the hydraulic fluid supplied to the brake unit 16 changes according to the valve position of the brake control valve 17. When the brake control valve 17 is moved to the brake operation position 17A, the operation of the brake unit 16 is activated. When the brake control valve 17 is moved to the brake release position 17B, the actuation of the brake unit 16 is stopped (released). In the present embodiment, it is assumed that the brake system has a configuration in which the braking force generated by the brake unit 16 increases as the brake pressure Pbr increases.

The operation amount U of the pedal depression for the brake pedal 15 is detected by a brake operation amount detection sensor 18, which is braking detection means. Additionally, the brake pressure Pbr supplied to the brake unit 16 is detected by a brake pressure detection sensor 19. The signal U detected by the brake operation amount detection sensor 18 and the signal Pbr detected by the brake pressure detection sensor 19 are inputted to the transmission controller 50. At the time of activating the brake (applying the brake), the brake pressure Pbr is normally 0.5 MPa or higher.

The transmission controller 50 generates a brake order signal corresponding to the inputted operation amount U of the pedal depression for the brake pedal, and outputs it to the brake control valve 17. As a result, with the increase in the operation amount U of the pedal depression for the brake pedal 15, the brake control valve 17 operates so as to move from the brake release position 17B to the brake operation position 17A. Thus, as the operation amount U of the pedal depression for the brake pedal 15 increases, the brake pressure Pbr supplied to the brake unit 16 becomes larger, whereby the braking force generated by the brake unit 16 becomes greater.

An output shaft of the transmission 20 is equipped with a vehicle speed sensor 27, which is vehicle speed detection means, for detecting the number of rotations Nt of the output shaft of the transmission. The signal Nt detected by the vehicle speed sensor 27 is inputted to the transmission controller 50. The transmission controller 50 converts the number of rotations Nt of the output shaft of the transmission to a speed V of the body 101. At the time of dump approach, the wheel loader 100 normally moves forward at the vehicle speed V of 2 km/h or faster.

The transmission controller 50 outputs a forward-backward drive clutch pressure order signal for selecting any of the forward-drive clutch 25 and the backward-drive clutch 26 in the transmission 20 to engage on the basis of the inputted forward and backward position signal, the shift range signal and so on, and outputs a speed stage clutch pressure order signal for selecting any of the speed stage clutches 21-24 in the transmission 20 to engage.

For example, when the forward-backward drive position signal for switching from the backward drive to the forward drive is inputted to the transmission controller 50 while the wheel loader 100 is traveling backward at the second speed stage (backward drive second speed "R2"), the transmission controller 50 outputs the forward-backward drive clutch pressure order signal for selecting the forward-drive clutch 25; decreases the clutch pressure in backward-drive clutch before changing speed in accordance with a prescribed hydraulic change pattern; raises the clutch pressure in the selected forward-drive clutch 25 after changing speed; and engages the forward-drive clutch 25 while disengaging the backward-drive clutch 26. As a result, the power from the engine 1 is transmitted through the selected forward-drive clutch 25 after changing speed in the transmission 20, the reduction gear 5 and the axle 6 to the drive wheels 7, whereby the drive wheels 7 are driven. The wheel loader 100 is switched from the backward drive to the forward drive, and travels forward at the second speed stage (forward drive second speed "F2").

The cab of the wheel loader 100 is equipped with a lock-up clutch switch 28 for on (engaging) and off (disengaging) the lock-up clutch 4.

The operation signal of the lock-up clutch switch 28 is inputted to the transmission controller 50. When the content of the operation signal of the lock-up clutch switch 28 is off, the transmission controller 50 outputs a lock-up clutch pressure order signal to disengage the lock-up clutch 4. Thus, as long as the lock-up clutch switch 28 is off, the power of the engine 1 is transmitted through the torque converter 2, the transmission 20, the reduction gear 5 and the axle 6 to the drive wheels 7. It should be noted that, if the lock-up clutch switch 28 is on, the transmission controller 50 outputs the lock-up clutch pressure order signal to engage the lock-up clutch 4 when the vehicle speed is a prescribed speed or faster. As a result, if the lock-up clutch switch 28 is on and the vehicle speed is the prescribed speed or faster, the power of the engine 1 is transmitted through the lock-up clutch 4, the transmission 20, the reduction gear 5 and the axle 6 to the drive wheels 7.

To the engine controller 60, a throttle correction order signal (throttle amount reduction order signal) for correcting the throttle amount S is inputted from the transmission controller 50 as described later. The engine controller 60 controls the engine 1 so as to correct the throttle amount S corresponding to the operation amount of the pedal depression for the accelerator pedal 10 based on the throttle correction order signal; output an order signal according to the corrected throttle amount S' to the governor 11; and obtain the target speed Nr according to the throttle amount S'.

The engine 1 is a diesel engine, and the engine output is controlled by adjusting the fuel amount injected into the cylinder. This adjustment is made by controlling the governor 11 provided to a fuel injection pump of the engine 1. As for the governor 11, all speed control type governor is generally employed, and the engine speed and the fuel injection amount are adjusted in accordance with load so as to obtain the target speed Nr according to the throttle amount S'. In other words, the governor 11 increases or decreases the fuel injection amount so as to eliminate the difference between the target speed Nr and the actual engine speed N.

FIG. 4 shows a torque diagram of the engine 1. The horizontal axis in FIG. 4 represents the engine speed N, while the vertical axis represents the engine torque.

In FIG. 4, a region defined by a maximum torque line represents the performance that the engine 1 has. The governor 11 controls the engine 1 so as not to exceed the maximum torque line and go into the exhaust limit, and such that the engine speed N does not exceed the high idle speed and go into the excess speed.

Here, when the engine controller 60 outputs an order to make the throttle amount S' 100%, the target speed of the engine 1 is set to a maximum target engine speed Nm corresponding to a rated point, and the governor 11 controls the engine speed in accordance with a maximum speed regulation line Fem connecting the rated point and a high idle point.

When the engine controller 60 outputs an order to make the throttle amount S' 95%, the target speed of the engine 1 is set to a engine speed N95 corresponding to 95% of the maximum target engine speed Nm, and the governor 11 controls the engine speed in accordance with a corresponding regulation line Fe95.

FIGS. 5A and 5B are flowcharts showing procedures of processes made in the transmission controller 50 and the work equipment controller 70.

In the present embodiment, on conditions that the throttle amount detection sensor 13 detects that the operation amount S of the accelerator pedal 10 is a prescribed threshold value (operation amount of 70%) or higher; the brake pressure detection sensor 19 detects that the brake unit 16 is activated (applying brake); the vehicle speed sensor 27 detects that the speed V of the body 101 is a prescribed threshold value (speed V is 2 km/h) or higher, the transmission controller 50 outputs the throttle correction order signal (order signal to decrease the throttle amount S by 5%) to decrease the target speed Nr of the engine 1 to the governor 11 through the engine controller 60, and outputs through the work equipment controller 70 to the pump control valve 12 an order to cover a discharge flow rate Q of a hydraulic pump 3, which is decreased by the throttle correction order, (decrease in a discharge flow rate Q by 5% due to a decrease in the engine speed N by 5%, which is caused by a decrease in the throttle amount S by 5%) to maintain the discharge flow rate Q from the hydraulic pump 3.

Steps 301-310 are a process implemented by the transmission controller 50, and steps 321-329 are a process implemented by the work equipment controller 70.

In other words, first, based on an operation signal indicating a selection operation position of the forward and backward drive selection lever 8, it is determined whether the current selection operation position is the forward-drive position "F"/backward-drive position "R" or other position (step 301).

Next, based on the signal S detected by the throttle amount detection sensor 13, it is determined whether or not the throttle amount S, which is an operation amount of the accelerator pedal 10, is 70% or over (accelerator opening is 70% or over) (step 302).

Next, based on the signal Nt detected by the vehicle speed sensor 27, it is determined whether or not the speed V is 2 km/h or faster (step 303).

Next, based on the signal Pbr detected by the brake pressure detection sensor 19, it is determined whether or not the brake unit 16 is activated (applying brake; the brake pressure Pbr is 0.5 MPa or higher) (step 304).

In a case where the selection operation position of the forward and backward drive selection lever 8 is the forward-drive position "F" or the backward-drive position "R" (YES in step 301); the accelerator opening is 70% or over (YES in step 302); the speed V is 2 km/h or faster; and the brake is activated (brake is applied) (YES in step 304), a throttle correction control, a control for forcedly releasing the lock-up clutch and a control for changing the swash plate angle at the time of lifting the boom, which are described below, are performed. It should be noted that the condition in step 301 includes a case where the body 101 is driving backward. This is because, even when the vehicle is moving backward not during dump approach, if the amount of pedal depression for the accelerator pedal 10 is large; the vehicle speed is a prescribed speed or faster: and the brake is applied, the load applied to the axle 6 becomes large and the heat generated by the brake unit 16 becomes high, which are required to be suppressed.

(1) Throttle Correction Control

The throttle correction control is a control for reducing the load applied to the axle 6 by suppressing the heat generated in the brake unit 16. The transmission controller 50 outputs the throttle correction order signal for decreasing the speed V by decreasing the throttle amount S by 5% to the engine controller 60 (step 305). Upon receiving the throttle correction order signal from the transmission controller 50, the engine controller 60 generates a throttle amount S' as a corrected throttle amount S' obtained by deducting 5% from the throttle amount S that is the operation amount of the pedal depression for the accelerator pedal 10, and controls the engine 1 by giving an order to the governor 11 so as to obtain a target engine speed corresponding to the corrected throttle amount S'. Accordingly, even if the accelerator pedal 10 is depressed by 100% and the throttle amount S become 100%, the throttle amount is corrected, and throttle amount S' limited to 95% of the throttle amount S can be obtained.

As a result, as shown in FIG. 4, the target speed Nr of the engine 1 is limited to the engine speed N95, which is 95% of the maximum target engine speed Nm. Thus, even if the accelerator pedal 10 is depressed by 100%, the speed N of the engine 1 is limited to the engine speed N95 corresponding to 95% of the maximum target engine speed Nm, and the vehicle speed V is reduced, accordingly.

Thus, when the wheel loader 100 moves while lifting the boom 80 and approaches a place where the load in the bucket 90 is to be dumped, such as during dump approach, the vehicle speed V is reduced. This leads to reduction in the load applied to the axle 6 and in the amount of heat generated by operating the brake unit 16, whereby the adverse effect caused by the increase in oil temperature can be avoided.

(2) Control for Forcedly Releasing the Lock-Up Clutch

When the lock-up clutch 4 is engaged, a lock-up clutch pressure order signal for disengaging (disengaged status) the lock-up clutch 4 is outputted (step 305). Thus, the power of the engine 1 is transmitted through the torque converter 2, the transmission 20, the reduction gear 5 and the axle 6 to the drive wheels 7, whereby the load applied to the drive wheels 7 is reduced.

(3) Control for Changing the Swash Plate Angle at the Time of Lifting the Boom

The control for changing the swash plate angle at the time of lifting the boom is a control for covering a 5% decrease in the discharge flow rate Q due to a 5% decrease in the engine speed N, which results from the throttle correction control, to maintain the discharge flow rate Q from the hydraulic pump 3.

The transmission controller 50 outputs to the work equipment controller 70 an order signal for changing the swash plate angle at the time of lifting the boom to maintain the discharge flow rate Q by increasing the swash plate angle of the hydraulic pump 3 by 5% (step 305).

Here, the work equipment controller 70 determines whether or not the wheel loader 100 lifts the boom 80 while loading the load in the bucket 90 as shown by the position D in FIG. 3 (steps 321, 322, 323).

In other words, based on the signal a detected by the boom angle detection sensor 84, the work equipment controller 70 determines whether or not the boom angle α is in a horizontal position or higher (step 321).

Next, based on the signal β detected by the tilt end position detection sensor 92, it is determined whether or not the hydraulic cylinder for bucket 91 reaches a tilt end position β (step 322).

Next, based on the signal Pbm detected by the boom bottom pressure detection sensor 85, it is determined whether or not the boom bottom pressure Pbm is a threshold value (20 MPa) or higher. The threshold value is a value for determining whether or not the boom 80 is being lifted while the load is loaded in the bucket 90, and varies according to the type of the wheel loader 100 (step 323).

If the boom angle α is in a horizontal position or higher (YES in step 321); the hydraulic cylinder for bucket 91 reaches the tilt end position β (YES in step 322); and the boom bottom pressure Pbm is the threshold value (20 MPa) or higher (YES in step 323), it is determined that the boom 80 is in the lifting operation in the state where the load is loaded in the bucket 90. Then, the swash plate angle order for limiting the upper limit value of the discharge flow rate Q of the hydraulic pump 3 to 70% is outputted to the pump swash plate control valve 12. This makes the upper limit value of the swash plate angle of the hydraulic pump 3 adjusted to maximum angle of 70%, whereby the upper limit of the discharge flow rate Q of the hydraulic pump 3 is cut to 70% of the maximum discharge flow rate. This control is called a boom flow rate cut control. The reason for performing the boom flow rate cut control is that, even if the limited value of the discharge flow rate Q of the hydraulic pump 3 is cut to the 70% of the maximum flow rate, it does not induce problem in terms of functionality of the operation (step 324).

Upon receiving the order to change the swash plate angle at the time of lifting the boom from the transmission controller 50 (step 325'), the work equipment controller 70 outputs a swash plate angle order to change the upper limit of the discharge flow rate Q of the hydraulic pump 3 from 70% to 75% to the pump swash plate control valve 12. As a result, the upper limit of the swash plate angle of the hydraulic pump 3 is changed from 70% to 75% of the maximum angle. For this reason, even if the engine speed N is reduced by 5% through the throttle correction control, the upper limit of the discharge flow rate Q of the hydraulic pump 3 is maintained to 70% of the maximum discharge flow rate, which is the upper limit by the boom flow rate cut control (step 325).

Thus, even if the engine speed N is reduced due to the throttle correction control, the discharge flow rate Q of the hydraulic pump 3 is maintained to 70%, which is the original upper limit of the boom flow rate cut control. Accordingly, the boom 80 is lifted at a desired speed without decreasing the lifting speed of the boom 80, whereby deterioration in operational efficiency can be avoided.

These are the details of the control for changing the swash plate angle at the time of lifting the boom.

Next, it is determined whether or not conditions for canceling the boom flow rate cut control in step 324 above are met.

In other words, based on the signal a detected by the boom angle detection sensor 84, the work equipment controller 70 determines whether or not the boom angle α is below the horizontal position (step 326).

Next, based on the signal β detected by the tilt end position detection sensor 92, it is determined whether or not the hydraulic cylinder for bucket 91 is in a position other than the tilt end position β (step 327).

Next, based on the signal Pbm detected by the boom bottom pressure detection sensor 85, it is determined whether or not the boom bottom pressure Pbm is less than the threshold value (20 MPa) (step 328).

Here, if none of the conditions for canceling the boom flow rate cut control are met (NO in all steps 326, 327, 328), the boom flow rate cut control is not canceled, and then the control for changing the swash plate angle at the time of lifting the boom is maintained (step 325). However, if any of the conditions for canceling the boom flow rate cut control is met, in other words, if the boom angle α is below the horizontal position (YES in step 326) or if the hydraulic cylinder for bucket 91 is in a position other than the tilt end position β (YES in step 327) or if the boom bottom pressure Pbm is less than the threshold value (20 MPa) (YES in step 328), it is determined that the boom 80 is not in the lifting operation in the state where the load is loaded in the bucket 90. Then, the boom flow rate cut control is shifted to the normal flow rate control, and a swash plate angle order to make the upper limit of the discharge flow rate Q of the hydraulic pump 3 100% is outputted to the pump swash plate control valve 12. Thus, the upper limit of the swash plate angle of the hydraulic pump 3 is adjusted to the maximum angle, and the upper limit of the discharge flow rate Q of the hydraulic pump 3 becomes the maximum discharge flow rate (100%) (step 329). It should be noted that, if any of the conditions for the boom flow rate cut control is not met (NO in at least any one of the steps 321, 322, 323), the boom flow rate cut control is not performed, and the normal flow rate control is maintained.

After performing the throttle correction control in step 305 and so on, the transmission controller 50 determines whether or not the conditions for canceling the throttle correction control and so on are met.

In other words, based on the operation signal indicating the selection operation position of the forward and backward drive selection lever 8, it is determined whether or not the current selection operation position is the neutral position "M", which is a position other than the forward-drive position "F" and the backward-drive position "R" (step 306).

Next, based on the signal S detected by the throttle amount detection sensor 13, it is determined whether or not a state where the throttle amount S, which is an operation amount of the accelerator pedal 10, is 50% or lower (accelerator opening is 50% or lower) continues for a prescribed period of time (0.3 second) or longer (step 307).

Next, based on the signal Nt detected by the vehicle speed sensor 27, it is determined whether or not the speed V is less than 2 km/h (step 308).

Next, based on the signal Pbr detected by the brake pressure detection sensor 19, it is determined whether or not operation of the brake unit 16 is released (stop applying brake; a state where the brake pressure Pbr is less than 0.5 MPa continues for a prescribed period of time (0.3 second) or longer) (step 309).

If none of the canceling conditions as described above is met (NO in all the steps 306, 307, 308, 309), the throttle correction control and so on are maintained (step 305). However, if any of the canceling conditions described above is met, in other words, if the selection operation position of the forward and backward drive selection lever 8 is in the neutral position "M" (YES in step 306) or if a state where the accelerator opening is 50% or lower continues for a prescribed period of time (YES in step 307) or if the vehicle speed V is less than 2 km/h (YES in step 308) or if the operation of the brake unit 16 is released (stop applying brake) (YES in step 309), all of the throttle correction control, the control for forcedly releasing the lock-up clutch and the control for changing the swash plate angle at the time of lifting the boom are canceled (step 310).

In other words, the transmission of the throttle correction order to the engine controller 60 is stopped; the control for reducing the speed N of the engine 1 by 5% is canceled; and, the engine target speed Nr is set to a value corresponding to the operation amount of the pedal depression for the accelerator pedal 10.

Additionally, the control for forcedly releasing the lock-up clutch is canceled. For example, if it takes five seconds or over after the lock-up clutch 4 is forcedly released, the control for forcedly releasing the lock-up clutch is canceled, and then the lock-up clutch 4 is normally controlled in accordance with the operation signal of the lock-up clutch switch 28. If it takes less than five seconds after the lock-up clutch 4 is forcedly released, the control for forcedly releasing the lock-up clutch is canceled at the time when five seconds elapses after the lock-up clutch 4 is forcedly released.

Additionally, the transmission of the order to change the swash plate angle at the time of lifting the boom to the work equipment 70 is stopped. At this time, the hydraulic pump 3 is controlled, through the normal flow rate control (step 329), such that the upper limit value of the swash plate angle is 100%.

It should be noted that, if any of the conditions for the throttle correction control and so on is not met (NO in at least any one of steps 301, 302, 303, 304), the throttle correction control and so on are not performed, and the normal control is maintained.

As described above, with the present embodiment, on conditions that the throttle amount detection sensor 13 detects that the operation amount S of the accelerator pedal 10 is a prescribed threshold value (operation amount of 70%) or higher (step 302); the brake pressure detection sensor 19 detects that the brake unit 16 is activated (applying brake) (brake pressure Pbr is 0.5 MPa or higher; step 304); the vehicle speed sensor 27 detects that the speed V of the body 101 is a prescribed threshold value (speed V is 2 km/h) or higher, the throttle correction order signal (order signal to decrease the throttle amount S by 5%) to decrease the target speed Nr of the engine 1 is outputted to the governor 11 through the engine controller 60, and the order to change the swash plate angle at the time of lifting the boom to cover an amount of a discharge flow rate Q of a hydraulic pump 3, which is decreased by the throttle correction order (a decrease in a discharge flow rate Q by 5% due to a decrease in the engine speed N by 5%, which results from a decrease in the throttle amount S by 5%) to maintain the discharge flow rate Q from the hydraulic pump 3 is outputted through the work equipment controller 70 to the pump control valve 12 (step 305). As a result, when the wheel loader 100 moves while lifting the boom 80 and approaches a place where a load in the bucket 90 is to be dumped, such as during dump approach, the load applied to the axle 6 is reduced, and the amount of heat generated by operating the brake unit 16 is reduced, whereby the adverse effect caused by the increase in oil temperature can be avoided. Additionally, the lifting speed of the boom 80 is maintained to the original lifting speed without decreasing the speed, whereby deterioration in efficiency of the operation made by the wheel loader 100 can be avoided.

It should be noted that, in the present embodiment, whether or not the operation amount of the accelerator pedal 10 is a prescribed value or over is determined based on the signal detected by the throttle amount detection sensor 10 (step 302). However, it may be possible to employ a configuration in which, in step 302, whether or not the engine speed N is a prescribed threshold value or over is determined based on the signal detected by the engine speed detection sensor 14, because what step 302 requires is only to determine whether or not the engine speed N is largely increased due to the fact that the accelerator pedal 10 is largely depressed.

Additionally, in the present embodiment, based on the signal detected by the brake pressure detection sensor 19, it is determined that the brake unit 16 is activated (applying brake) (step 304). However, it may be possible to employ a configuration in which, in step 304, it is determined based on the signal detected by the brake operation amount detection sensor 18 that the operation amount U of the pedal depression for the brake pedal 15 is a prescribed threshold value or over, because what step 304 requires is only to determine whether or not the brake pedal 15 is depressed and the brake unit 16 is activated.

Additionally, in the present embodiment, although the description has been made by using specific values for each of the threshold values in steps 302, 303, 304, those values are only examples and vary according to type of the wheel loader 100. However, it is desirable to set the threshold values in steps 302, 303, 304 to values suitable for the situation (dump approach) where the wheel loader 100 moves while lifting the boom 80 and approaches a place where a load in the bucket 90 is to be dumped.

Additionally, in the present embodiment, a situation (dump approach) where the wheel loader 100 moves while lifting the boom 80 and approaches a place where a load in the bucket 90 is to be dumped is determined based on the traveling conditions (steps 301-304). However, it may be possible to determine the situation based on the conditions of the work equipment rather than the traveling conditions, for example, based on the conditions of the work equipment as shown in steps 321, 322, 323.

Additionally, in the present embodiment, the description has been made on an assumption of a wheel loader as a working vehicle. However, the present invention may be similarly applied to a forklift or other working vehicles, provided that the power of the engine 1 in the working vehicle is provided to the hydraulic pump 3 and the traveling power train 40.

Figure 1A:
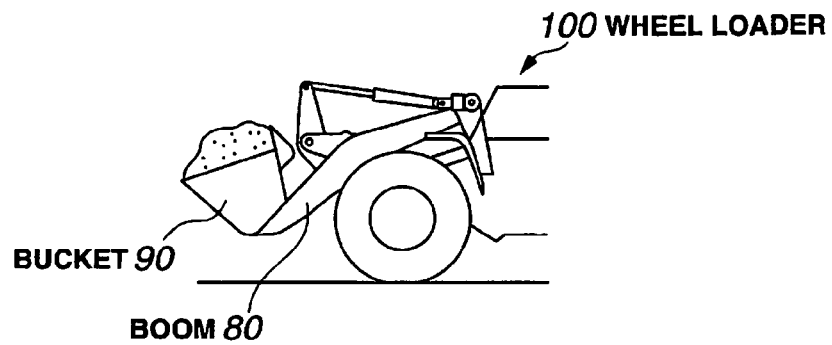
FIGS. 1A, 1B, 1C and 1D are diagrams explaining a dump approach.
Figure 1B:
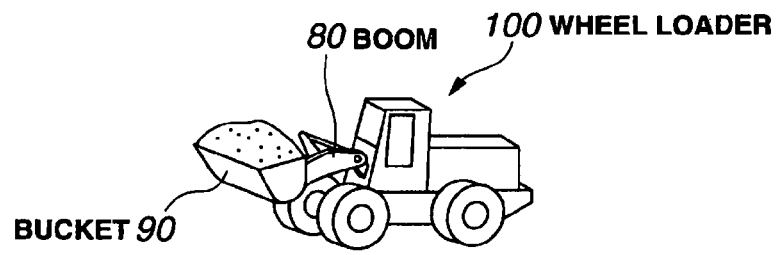
Figure 1C:
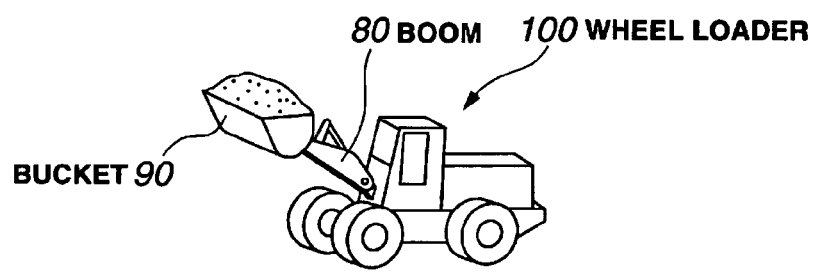
Figure 1D:
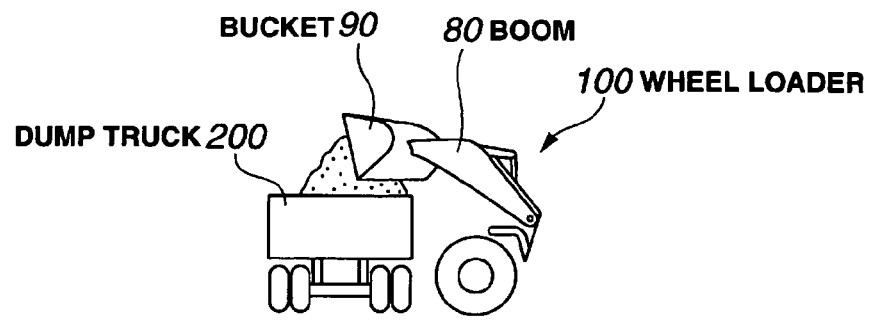
Figure 2:
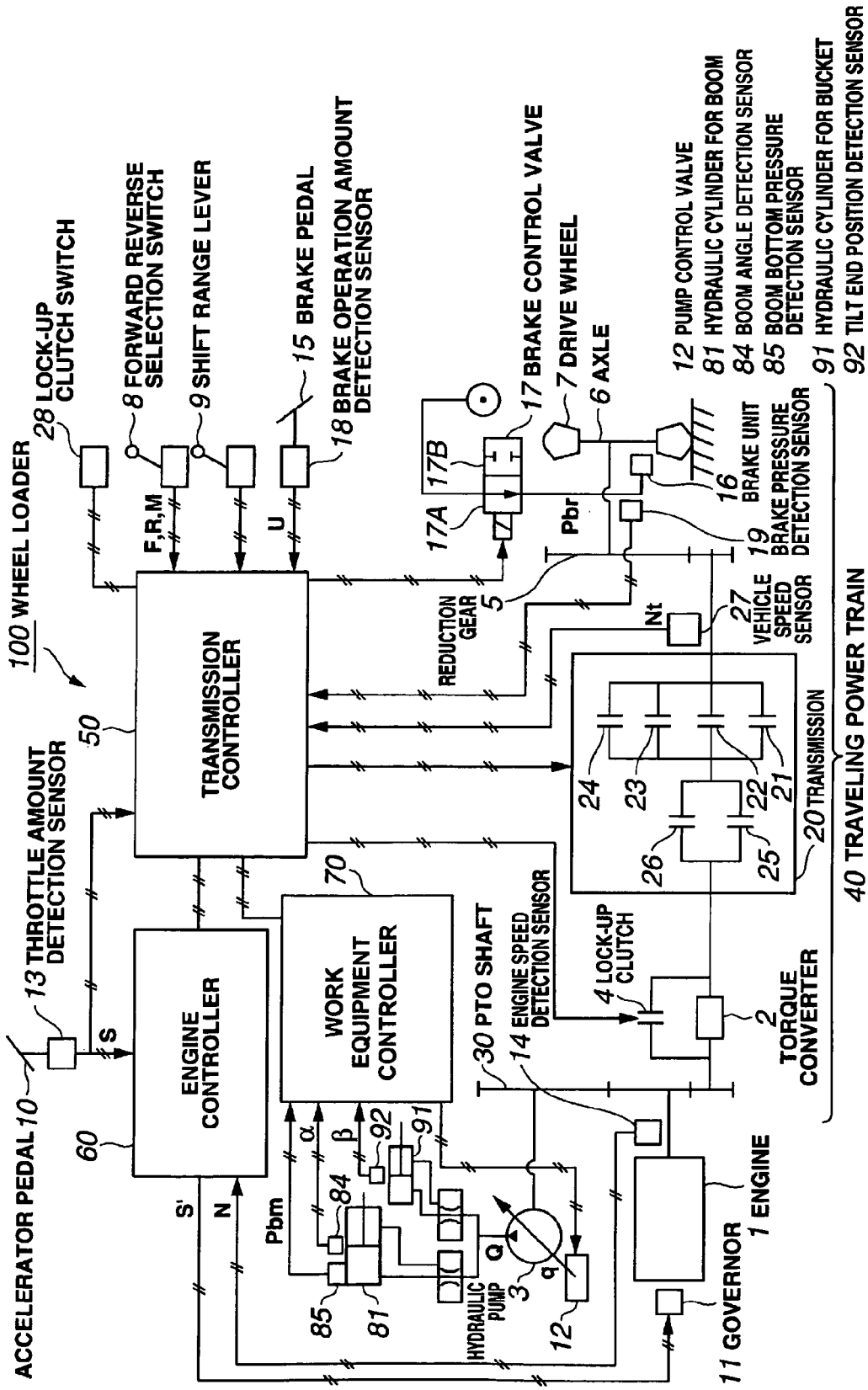
FIG. 2 is a configuration diagram of a wheel loader in the present embodiment.
Figure 3:
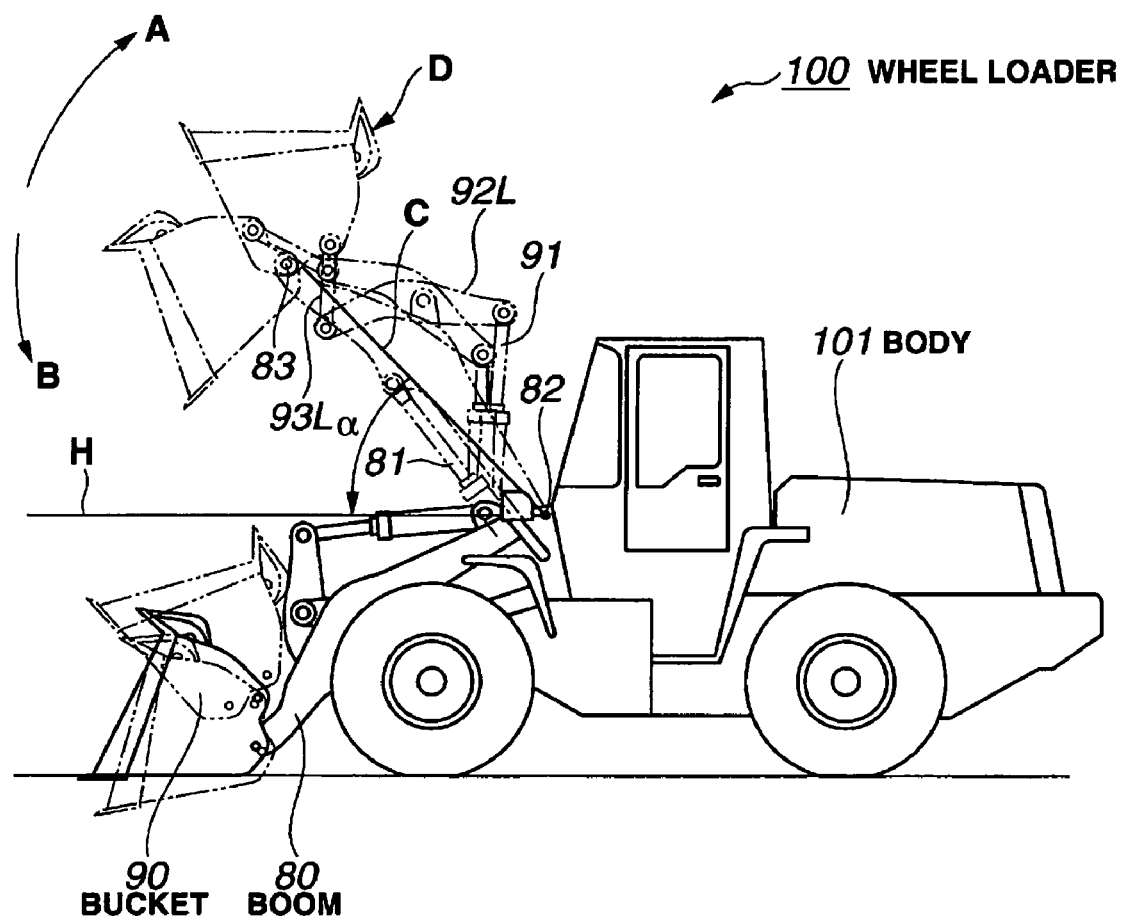
FIG. 3 is a side view of the wheel loader in the present embodiment.
Figure 4:
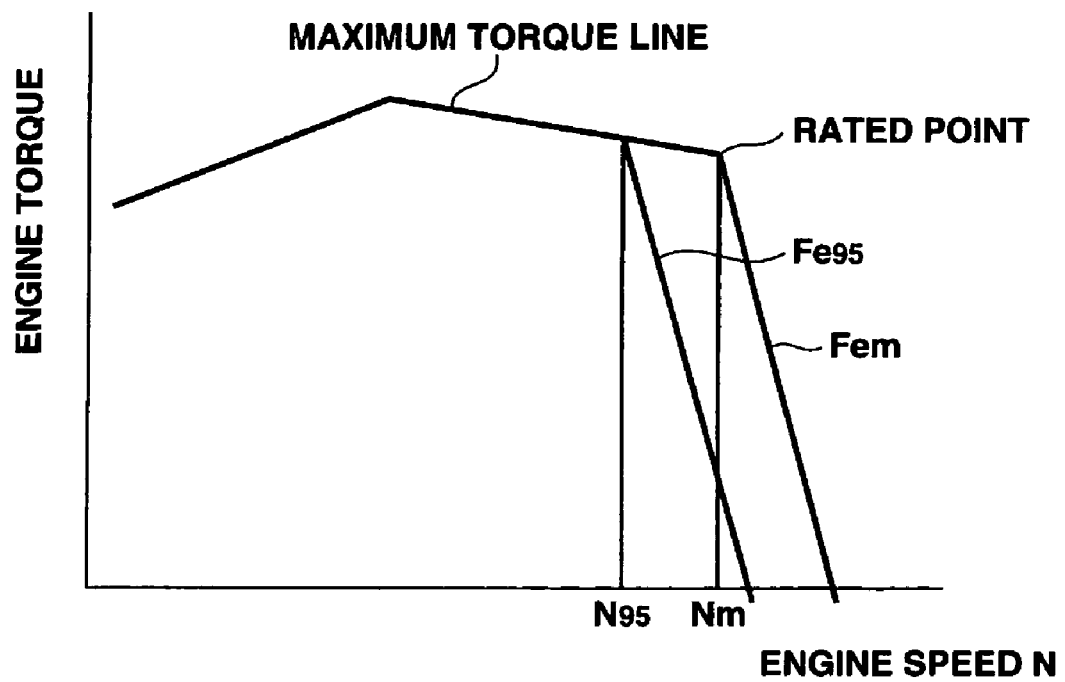
FIG. 4 is a torque diagram of an engine of the wheel loader in the present embodiment.
Figure 5A:
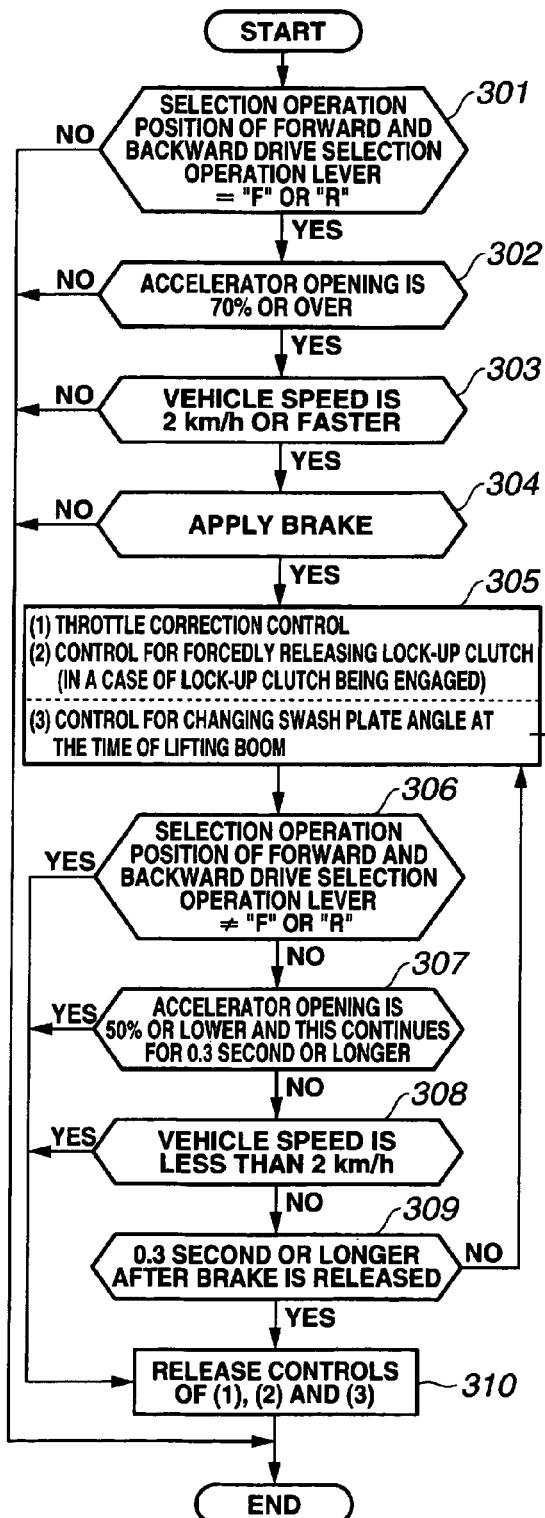
FIGS. 5A and 5B are flowcharts showing process procedures implemented in the controller in the present embodiment.
Figure 5B:
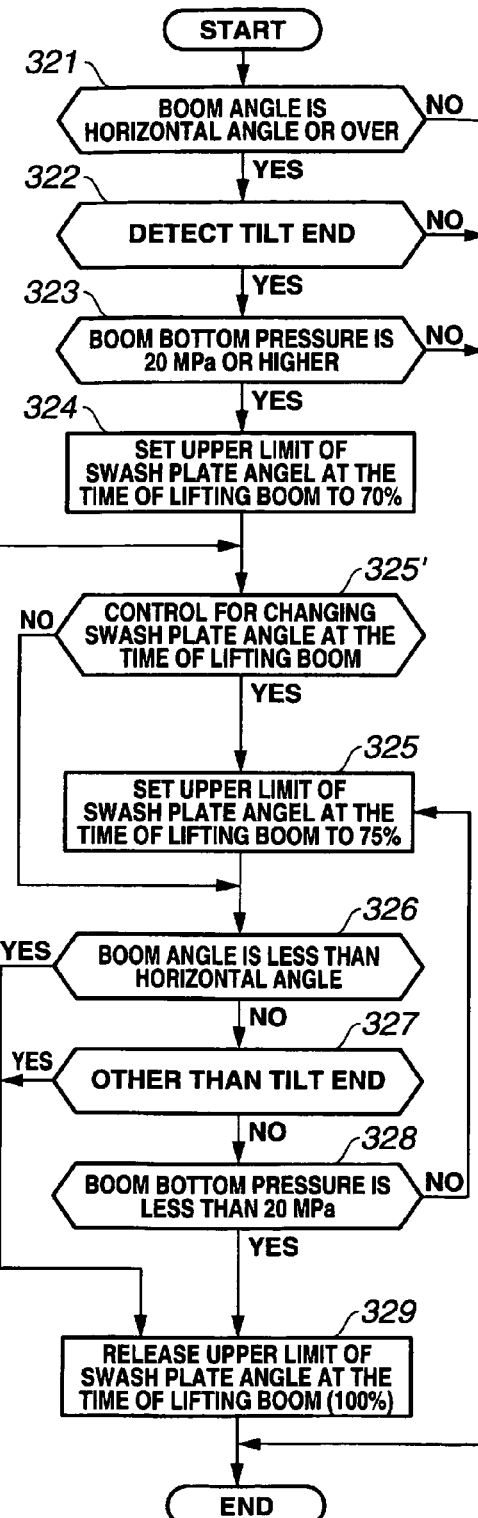

The invention claimed is:

1. A device for controlling an engine and a hydraulic pump of a working vehicle in which power of the engine is provided to a traveling power train and the hydraulic pump; driving wheels are driven through the traveling power train; and work equipment is operated through the hydraulic pump, the device comprising:

accelerator operation means that sets a target speed of the engine according to an operation amount;

engine speed adjusting means that adjusts a speed of the engine to an ordered target speed;

hydraulic pump adjusting means that adjusts a displacement of the hydraulic pump so as to obtain an ordered discharge flow rate;

acceleration amount detection means that detects that the operation amount of the accelerator operation means or the engine speed is a prescribed threshold value or higher;

brake operation means that sets a braking force for a vehicle body according to an operation amount;

brake means that generates the braking force so as to obtain the braking force set by the brake operation means;

braking detection means that detects that the brake means is activated or that the brake operation means is operated;

vehicle speed detection means that detects that a speed of the vehicle body is a prescribed threshold value or higher; and engine and hydraulic pump control means that provides the engine speed adjusting means with an order to decrease the target speed of the engine, and to cover a decrease in the discharge flow rate of the hydraulic pump due to the order, provides the hydraulic pump adjusting means with an order to maintain the discharge flow rate of the hydraulic pump, on conditions that the acceleration amount detection means detects that the operation amount of the accelerator operation means or the engine speed is the prescribed threshold value or higher; the braking detection means detects that the brake means is activated or that the brake operation means is operated; and the vehicle speed detection means detects that the speed of the vehicle body is the prescribed threshold value or higher.

2. The device for controlling an engine and a hydraulic pump of a working vehicle according to claim 1, wherein the working vehicle is a wheel loader; and each of the threshold values is set to a value suitable for a situation where the wheel loader moves while lifting a boom and approaches a place where a load in a bucket is to be dumped.

3. A method for controlling an engine and a hydraulic pump of a working vehicle in which power of the engine is provided to a traveling power train and the hydraulic pump; driving wheels are driven through the traveling power train; and work equipment is operated through the hydraulic pump, the method comprising:

on conditions that it is detected that an operation amount of accelerator operation means or an engine speed is a prescribed threshold value or higher; it is detected that brake means is activated or that brake operation means is operated; and it is detected that a speed of a vehicle body is a prescribed threshold value or higher, decreasing a target speed of the engine; and covering a decrease in a discharge flow rate of the hydraulic pump due to the decrease in the target speed of the engine to maintain the discharge flow rate of the hydraulic pump.

4. The method for controlling an engine and a hydraulic pump of a working vehicle according to claim 3, wherein the working vehicle is a wheel loader; and each of the threshold values is set to a value suitable for a situation where the wheel loader moves while lifting a boom and approaches a place where a load in a bucket is to be dumped.

* * * * *